US008719567B2

(12) United States Patent
Weis et al.

(10) Patent No.: US 8,719,567 B2
(45) Date of Patent: May 6, 2014

(54) ENABLING QOS FOR MACSEC PROTECTED FRAMES

(75) Inventors: Brian Weis, San Jose, CA (US); Saurabh Mohan, Pleasanton, CA (US); Chandramouli Radhakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 12/579,329

(22) Filed: Oct. 14, 2009

(65) Prior Publication Data

US 2011/0087878 A1    Apr. 14, 2011

(51) Int. Cl.
*H04L 29/06* (2006.01)

(52) U.S. Cl.
CPC ............ *H04L 63/0457* (2013.01); *H04L 63/16* (2013.01)
USPC ............................. 713/160; 713/151; 713/152

(58) Field of Classification Search
USPC ........... 713/150–153, 160–161; 709/223–226
See application file for complete search history.

(56) References Cited

U.S. PATENT DOCUMENTS

| | | | | |
|---|---|---|---|---|
| 7,058,802 | B1* | 6/2006 | Epstein et al. | 713/150 |
| 8,000,725 | B2* | 8/2011 | Alexander | 455/456.3 |
| 8,009,613 | B1* | 8/2011 | Gunasekara et al. | 370/328 |
| 2005/0009578 | A1* | 1/2005 | Liu | 455/574 |
| 2006/0104230 | A1* | 5/2006 | Gidwani | 370/328 |
| 2008/0115203 | A1* | 5/2008 | Elzur | 726/12 |
| 2008/0130894 | A1* | 6/2008 | Qj et al. | 380/277 |
| 2009/0083445 | A1* | 3/2009 | Ganga | 709/250 |
| 2009/0217032 | A1* | 8/2009 | Guan | 713/154 |
| 2009/0276830 | A1* | 11/2009 | O'Connor | 726/3 |
| 2009/0307751 | A1* | 12/2009 | Lin et al. | 726/3 |
| 2010/0316049 | A1* | 12/2010 | Diab | 370/389 |
| 2011/0173678 | A1* | 7/2011 | Kaippallimalil et al. | 726/4 |

* cited by examiner

*Primary Examiner* — Benjamin Lanier
(74) *Attorney, Agent, or Firm* — Hickman Palermo Truong Becker Bingham Wong LLP (57) ABSTRACT

Embodiments associated with enabling Quality of Service (QoS) for MACsec protected frames are described. One example method includes identifying a security indicator in an encrypted network communication and selectively forwarding the encrypted network communication according to a QoS policy. The example method may also include selectively storing a control packet security indicator sniffed from a control packet network communication in response to determining that a match exists between a control packet identification field and a QoS database entry.

21 Claims, 8 Drawing Sheets

ENABLING QOS FOR MACSEC PROTECTED FRAMES

BACKGROUND

Data Center Interconnect (DCI) solutions deploy Ethernet between data centers. A customer using a DCI solution often requires Quality of Service (QoS) for Ethernet frames sent between data centers. QoS concerns, among other things, the ability to apply different priority levels to different applications, users, or data flows in order to provide differing performance levels. QoS conventionally uses Virtual Local Area Network (VLAN) tags in the Ethernet frames. A Wide Area Network (WAN) may not securely connect data centers. The WAN may be exposed to malicious interference. Therefore, a tunneling protocol is generally used to encapsulate the Ethernet frames. Implementing a tunneling protocol requires encrypting the Ethernet frames. When performing this encryption with Media Access Control Security (MACsec) the VLAN tags necessary to implement QoS are encrypted. Conventionally, implementing QoS with the encrypted VLAN tags has been impossible. This inhibits using MACsec in many Ethernet provider networks.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Systems, apparatus, and methods associated with enabling QoS for MACsec protected frames are described. Example systems, apparatus, and methods selectively forward encrypted communications according to a QoS policy. Providing QoS for MACsec protected frames has been difficult because inspecting encrypted fields is traditionally necessary. Correlating the protected frames with control packets through a common identification field allows QoS to be applied to the protected frames. One example method includes identifying a security indicator in an encrypted network communication. The method also includes selectively forwarding the encrypted network communication.

Embodiments

The network communication may be forwarded subject to Quality of Service (QoS) policies. The encrypted network communication is forwarded to a switch, router, or other network device in a Data Center Interconnect (DCI) according to a policy. Typically, the policy is a QoS policy stored in a QoS database. The QoS policy is associated with a known security indicator in the QoS database. Selectively forwarding the encrypted network communication may also include adding an IEEE Std 802.1Q header to the encrypted network communication with a Class of Service (CoS) field. A CoS field is added to the encrypted network communication as a function of the policy associated with the known security indicator.

The security indicator identified in the encrypted network communication is matched to a known security indicator in the QoS database. A security indicator may be a secure channel indicator (SCI) in a Media Access Control Security (MACsec) packet. The encrypted network communication may be a MACsec communication as specified in IEEE Std 802.1AE and may be encrypted according to IEEE Std 802.1X.

The method also includes selectively storing a control packet security indicator. The control packet security indicator is sniffed from a control packet. In one embodiment, the control packet can be a MACsec Key Agreement (MKA) packet. When a match exists between a control packet identification field and a QoS database entry the security indicator from the control packet is stored in the QoS database. The control packet security indicator is associated with the entry in the QoS database and stored as a known security indicator. The QoS database entry that matches the control packet identification field can be provided to the QoS database manually through a management console or automatically by a provisioning protocol.

References to "one embodiment", "an embodiment", "one example", "an example", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

A "computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

It has proven convenient at times, principally for reasons of common usage, to refer to these signals as bits, values, elements, symbols, characters, terms, and numbers. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
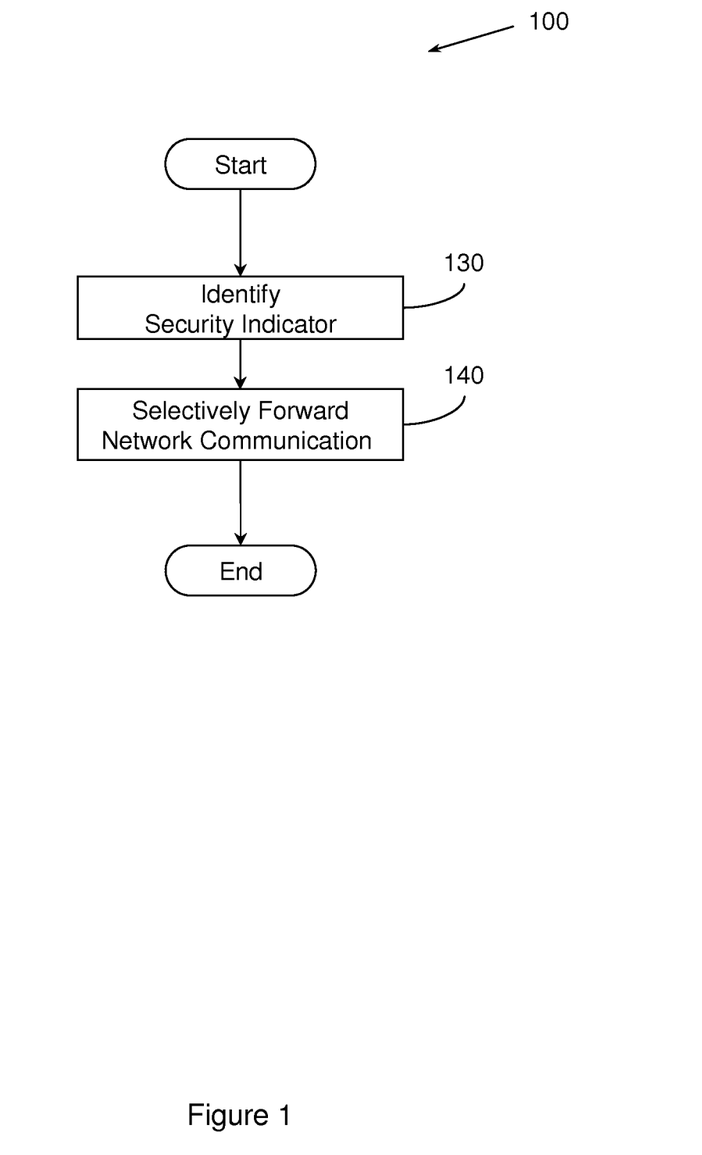
FIG. 1 illustrates an example method associated with selectively forwarding encrypted network communications.

FIG. 1 illustrates a method 100 associated with enabling QoS for MACsec protected frames. Method 100 may include, at 130, identifying a security indicator in an encrypted network communication. In one example, identifying a security indicator includes scanning an encrypted network communication's Secure Channel Indicator (SCI) header field. This facilitates identifying a layer 2 communication associated with an established connection to be processed according to a desired QoS. The SCI provides a correlation between MACsec Key Agreement (MKA) packets and an encrypted network communication since both have an SCI field. Encrypting the network communication conceals the VLAN tag. The VLAN tag and/or other data (e.g., COS) traditionally may function as the indicators used to determine QoS. Thus, correlating the SCI field with a QoS policy facilitates applying QoS to encrypted MACsec communications.

Method 100 may also include, at 140, selectively forwarding the encrypted network communication. Selectively forwarding the encrypted network communication includes forwarding the encrypted network communication over a connection according to a QoS policy associated with a known security indicator. The security indicator identified in the encrypted network communication is used to match the security indicator to a known security indicator. The QoS policy controls QoS over the connection. The connection may be a connection to a switch, router, or other network device that provides layer 1 (L1) and/or layer 2 (L2) services between data centers. The services may be provided over, for example, an Ethernet-over-Multiprotocol Label Switching (MPLS) network, a Metro Ethernet network using QinQ (IEEE Std 802.1ad), and a Virtual Private LAN Service (VPLS) provider network.

While FIG. 1 illustrates various actions occurring in serial, it is to be appreciated that various actions illustrated in FIG. 1 could occur substantially in parallel. By way of illustration, a first process could identify a security indicator, and a second process could selectively forward network communications. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer readable medium may store computer executable instructions that if executed by a machine (e.g., processor) cause the machine to perform a method that includes selectively forwarding encrypted network communications. While executable instructions associated with the above method are described as being stored on a computer readable medium, it is to be appreciated that executable instructions associated with other example methods described herein may also be stored on a computer readable medium.

Provisioning of the QoS database occurs prior to instantiating method 100. Provisioning may occur in several different ways. One way to provision the QoS database is through a management console, another is by a provisioning protocol. Provisioning the QoS database includes providing the database with identification information for the control packets. This information correlates to an identification field in a control packet and may include a Connectivity Association Key Name (CKN), a Key Management Domain (KMD), a Virtual Local Area Network (VLAN) tag, an Announcement Type-Length-Value (TLV), and a vendor-defined TLV. This information forms the QoS policy when related to a desired QoS for connections to a service provider network.

Figure 2:
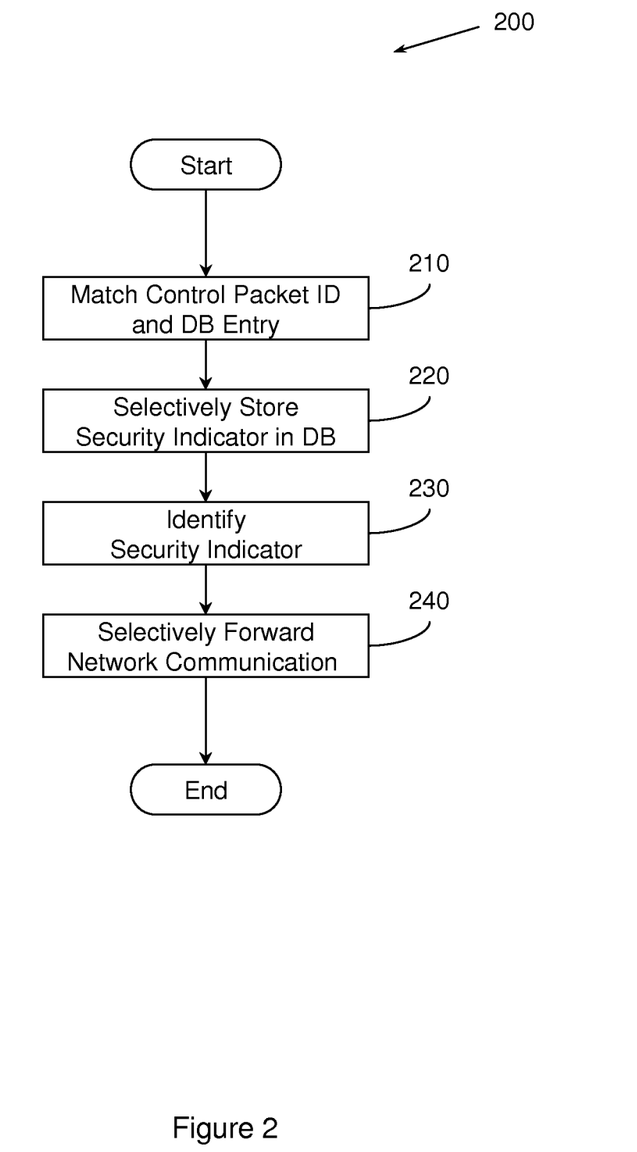
FIG. 2 illustrates another example method associated with selectively forwarding encrypted network communications.

FIG. 2 illustrates a method 200 associated with matching a control packet security indicator with an entry in the QoS database. At 210, the method 200 may include determining if a match exists between a control packet identification field and a QoS database entry. If a match exists then, at 220, a security indicator sniffed from the control packet is selectively stored as a known security indicator and associated with the matching entry in the QoS database.

As discussed in method 100, method 200 similarly identifies a security indicator in an encrypted network communication, at 230. At 240, method 200 selectively forwards the encrypted network communication according to a QoS policy. The encrypted network communication is forwarded according to a QoS policy if a match exists between the security indicator in the encrypted network communication and a known security indicator associated with a QoS policy in the QoS database. If a match does not exist, then the encrypted network communication is not forwarded.

Figure 3:
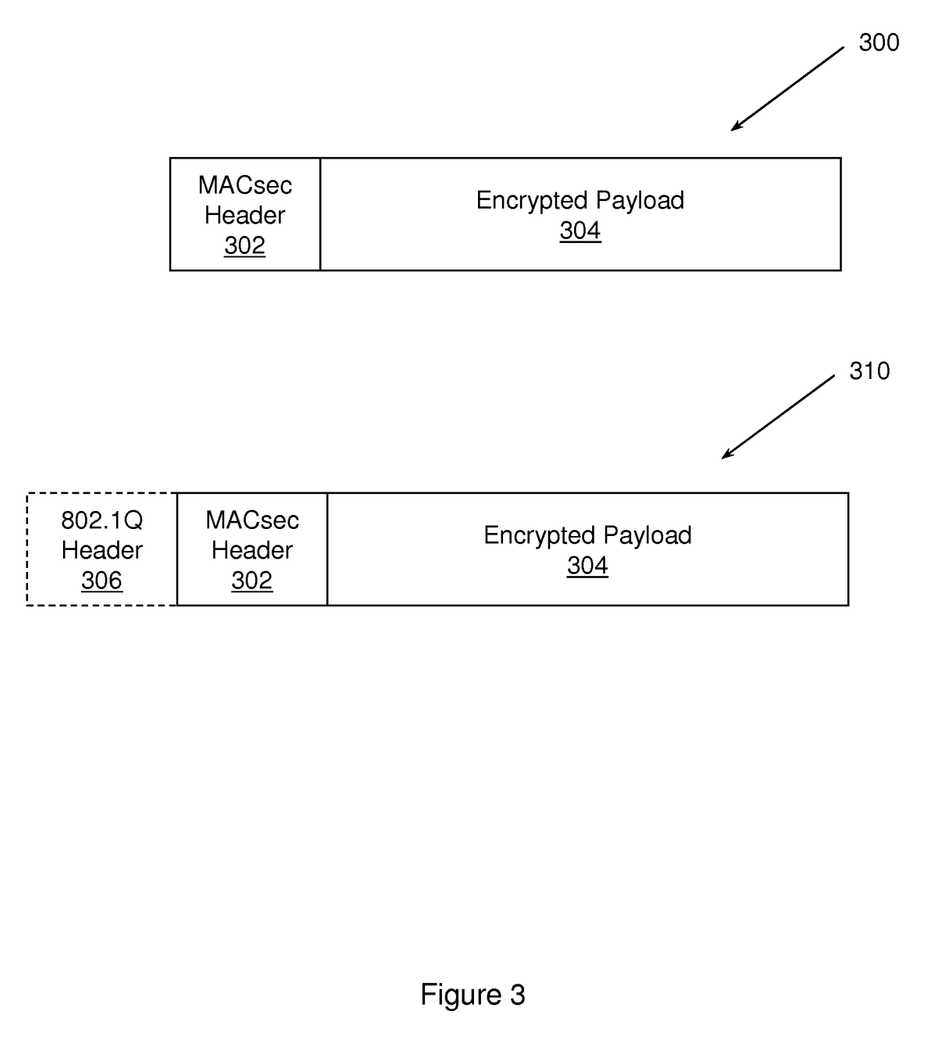
FIG. 3 illustrates an example MACsec packet.

As illustrated in FIG. 3, selectively forwarding the encrypted network communication 300 may also include adding an IEEE Std 802.1Q header 306 with a Class of Service (CoS) field to the encrypted network communication 300. The value of the CoS field is determined as a function of the QoS policy associated with the security indicator in the encrypted network communication 300. In this case, the CoS field is used to control QoS to the encrypted network communication 310. The IEEE Std 802.1Q header 306 is a second IEEE Std 802.1Q header added according to IEEE Std 802.1ad. A first IEEE Std 802.1Q header is encrypted in the encrypted payload 304 as part of MACsec encryption. A MACsec header 302 is used to identify the encrypted network communication 300.

Figure 4:
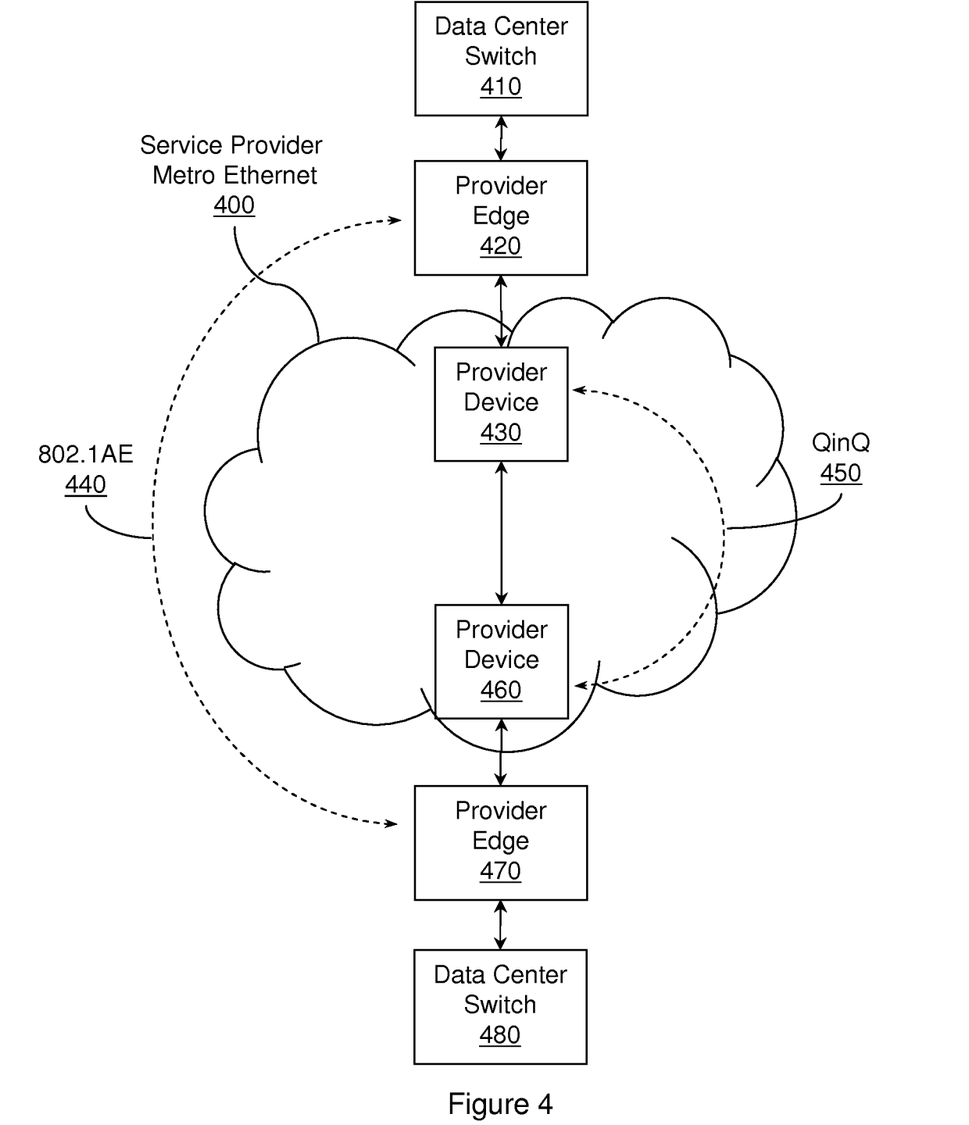
FIG. 4 illustrates an example DCI and provider network.

FIG. 4 illustrates an embodiment where, for example, a Provider Edge (PE) device 420 or 470 applies MACsec (IEEE Std 802.1AE) 440 to communications of a Data Center Interconnect (DCI). Data center switches 410 and 480 forward communications to PE devices 420 and 470. PE devices 420 and 470 encrypt the communications, and forward the communications to Provider Devices 430 and 460 in, for example, a Service Provider Metro Ethernet 400. Provider Devices 430 and 460 optionally add a second IEEE Std 802.1Q header to facilitate communication by QinQ 450. PE devices 470 and 420 may also decrypt encrypted communications received from Provider Devices 430 and 460 and forward the communications to Data Center Switches 410 and 480 respectively.

In the embodiment illustrated in FIG. 4, Provider Devices 430 and 460 may perform methods similar to methods 100 and 200 to provide QoS. For example, Provider Devices 430 and 460 may identify a security indicator in an encrypted network communication and then selectively forward the encrypted network communication according to a policy associated with a known security indicator in a QoS database. Recall that the policy controls QoS associated with a connection over which the encrypted network communication is forwarded. Additionally, Provider Devices 430 and 460 may selectively store a control packet security indicator sniffed from a control packet network communication. The control packet security indicator may be associated with an entry in the QoS database and may be stored in response to determining that a match exists between a control packet identification field and a QoS database entry. The control packet identification field may be, for example, a Connectivity Association Key Name (CKN) field, a Key Management Domain (KMD) field, a Virtual Local Area Network (VLAN) tag, a field in an Announcement Type-Length-Value (TLV), and a vendor-defined TLV. In one embodiment, the control packet is a MACsec Key Agreement (MKA) packet and the the security indicator is a secure channel indicator (SCI) in a Media Access Control Security (MACsec) packet.

Figure 5:
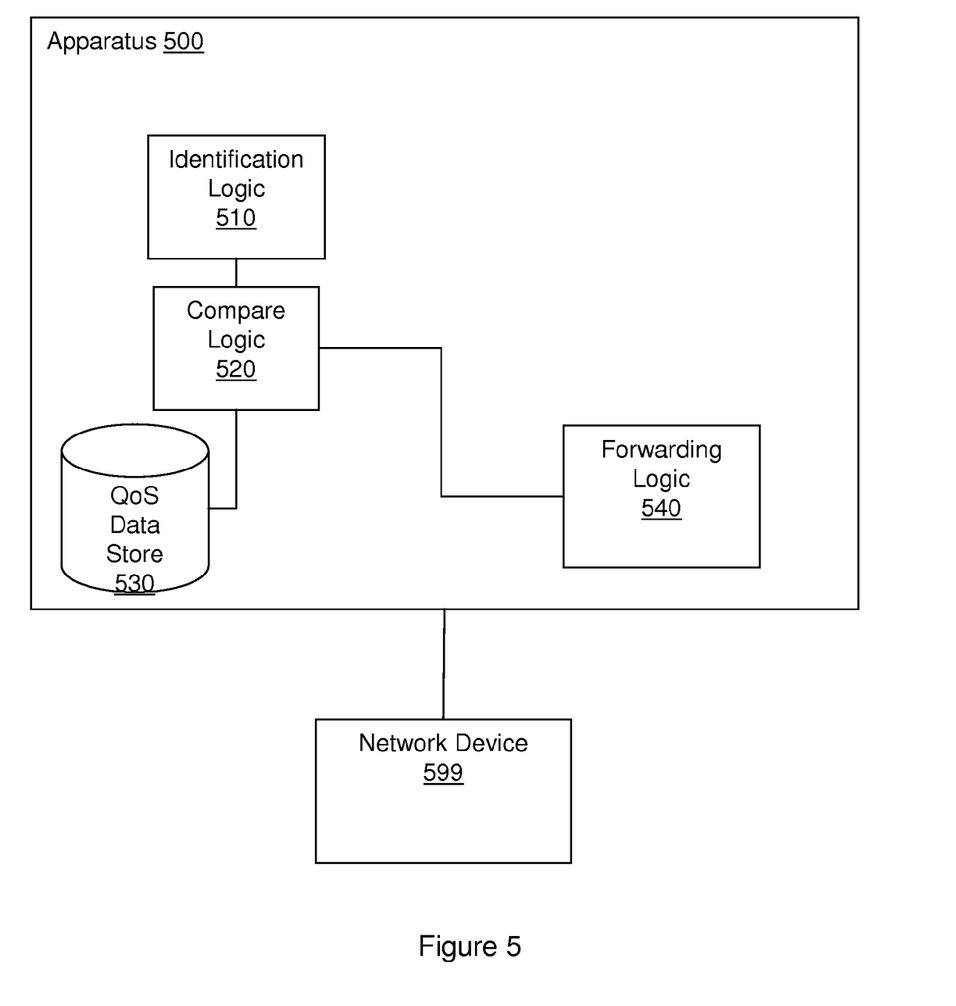
FIG. 5 illustrates an example apparatus associated with selectively forwarding encrypted network communications.

FIG. 5 illustrates an apparatus 500 associated with enabling QoS for MACsec protected frames. Apparatus 500 may include identification logic 510 to detect a passport signal in an encrypted network communication. The passport signal may be, for example, an SCI in a MACsec packet. Apparatus 500 may also include a compare logic 520 to determine if the passport signal is a known passport signal associated with a QoS policy. The QoS policy dictates the QoS for a connection. The QoS policy and known passport signals are stored in a QoS data store 530. Forwarding logic 540 selectively relays the encrypted network communication as a function of the passport signal in the encrypted network communication. Relaying the encrypted network communication may include, for example, sending the encrypted network communication to a switch, router, or other network device switch 599, or a router in a service provider network.

Supplying the QoS data store 530 with a QoS policy may occur prior to receiving an encrypted network communication. The QoS policy may also be updated after receiving an encrypted network communication. Supplying the QoS policy may occur in several different ways. One way to supply the QoS data store with a QoS policy is through a management console, another is by a management protocol. Supplying the QoS data store 530 with a QoS policy may be done manually or automatically. Supplying the QoS data store 530 with a QoS policy may include providing a plurality of QoS entries. A QoS entry may include a QoS requirement for a connection, a Virtual Local Area Network (VLAN) tag, a known passport signal, and a control packet identifier. The control packet identifier correlates to a control packet identification field. The control packet identification field may be a Connectivity Association Key Name (CKN), a Key Management Domain (KMD), a Virtual Local Area Network (VLAN) tag, an Announcement Type-Length-Value (TLV), and a vendor-defined TLV.

Figure 6:
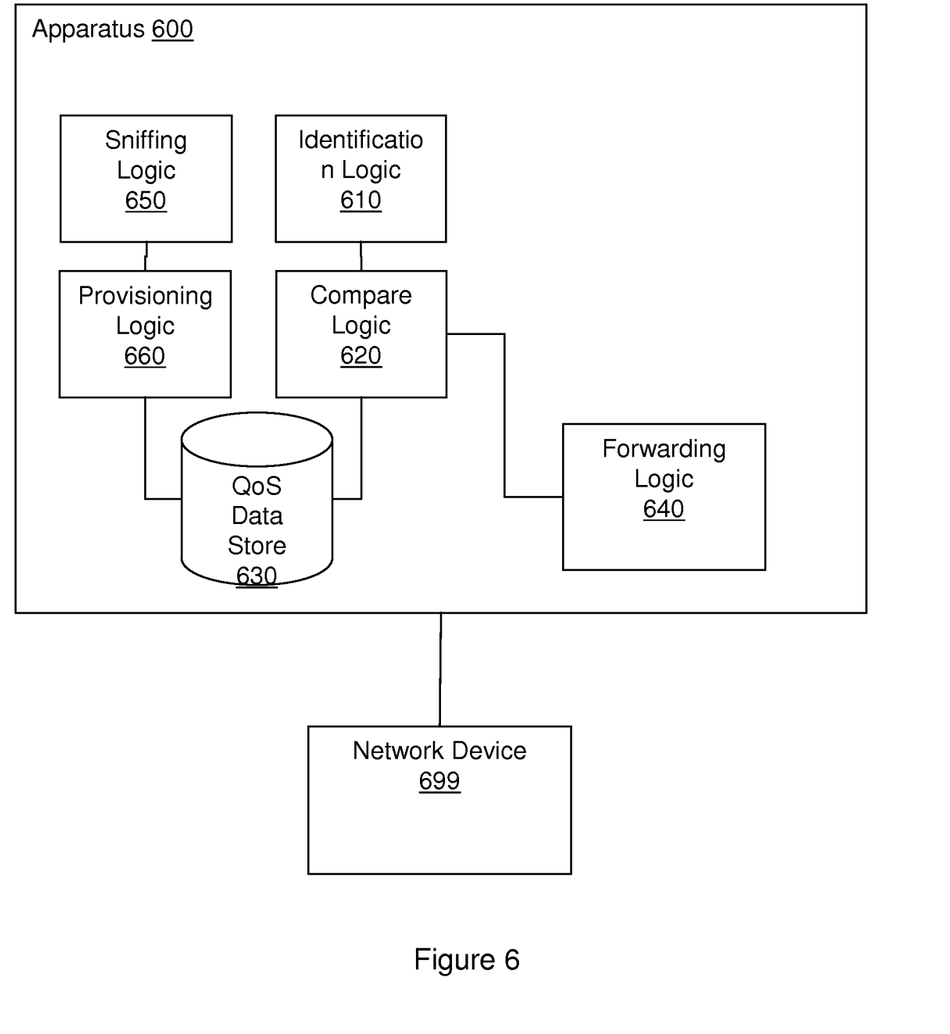
FIG. 6 illustrates another example apparatus associated with selectively forwarding encrypted network communications.

FIG. 6 illustrates an apparatus 600 associated with enabling QoS for MACsec protected frames. Some elements similar to those discussed in connection with apparatus 500 that are present in apparatus 600 may include identification logic 610, compare logic 620, a QoS data store 630, and forwarding logic 640. Apparatus 600 may also include sniffing logic 650 to identify a control packet passport signal in a control packet network communication as a known passport signal. Provisioning logic 660 stores the control packet passport signal as a known passport signal in the QoS data store in response to determining that a match exists between a control packet identification field and a QoS data store entry. The control packet passport signal is associated with an entry in the QoS data store and stored as a known passport indicator. Apparatus 600 may be, for example, a layer 2 switch, an enterprise switch, and a router. Relaying the encrypted network communication may include, for example, sending the encrypted network communication to a switch, router, or other network device 699, or a router in a service provider network.

Figure 7:
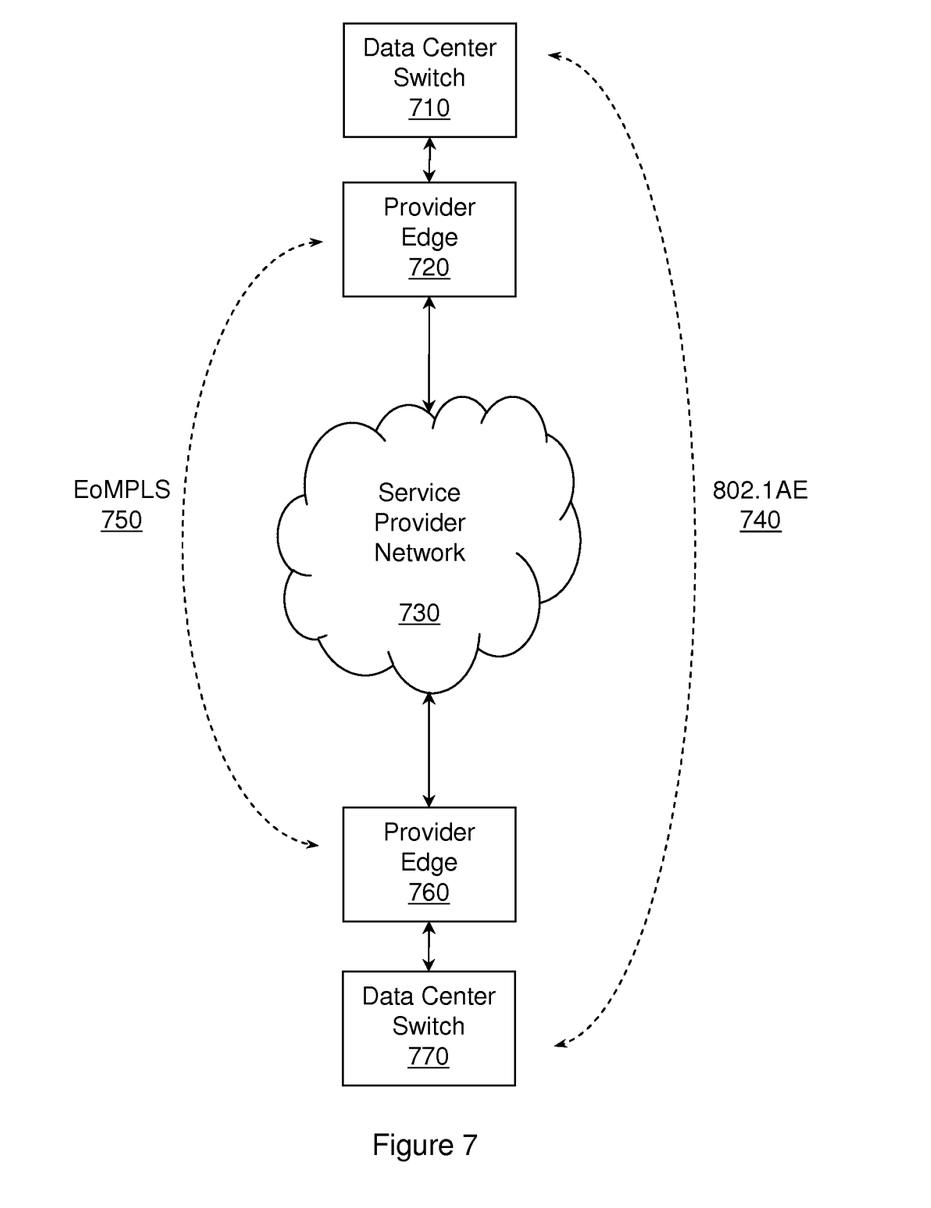
FIG. 7 illustrates another example DCI and provider network.

FIG. 7 illustrates an exemplary DCI. In this example, Data Center Switches 710 and 770 encrypt network communications according to MACsec IEEE Std 802.1AE 740 and forward the encrypted network communications to PE devices 720 and 760 respectively. PE devices 720 and 760 apply QoS to the encrypted network communications and forward the encrypted network communications over Service Provider Network 730 using, for example, Ethernet over MPLS 750. In this example, Provider Edge devices 720 and 760 may implement methods similar to methods 100 and 200 to facilitate QoS.

In the embodiment illustrated in FIG. 7, PE Devices 720 and 760 may perform methods similar to methods 100 and 200 to provide QoS. For example, PE Devices 720 and 760 may identify a security indicator in an encrypted network communication and then selectively forward the encrypted network communication according to a policy associated with a known security indicator in a QoS database. Recall that the policy controls QoS associated with a connection over which the encrypted network communication is forwarded. Additionally, PE Devices 720 and 760 may selectively store a control packet security indicator sniffed from a control packet network communication. The control packet security indicator may be associated with an entry in the QoS database and may be stored in response to determining that a match exists between a control packet identification field and a QoS database entry. The control packet identification field may be, for example, a Connectivity Association Key Name (CKN) field, a Key Management Domain (KMD) field, a Virtual Local Area Network (VLAN) tag, a field in an Announcement Type-Length-Value (TLV), and a vendor-defined TLV. In one embodiment, the control packet is a MACsec Key Agreement (MKA) packet and the the security indicator is a secure channel indicator (SCI) in a Media Access Control Security (MACsec) packet.

Figure 8:
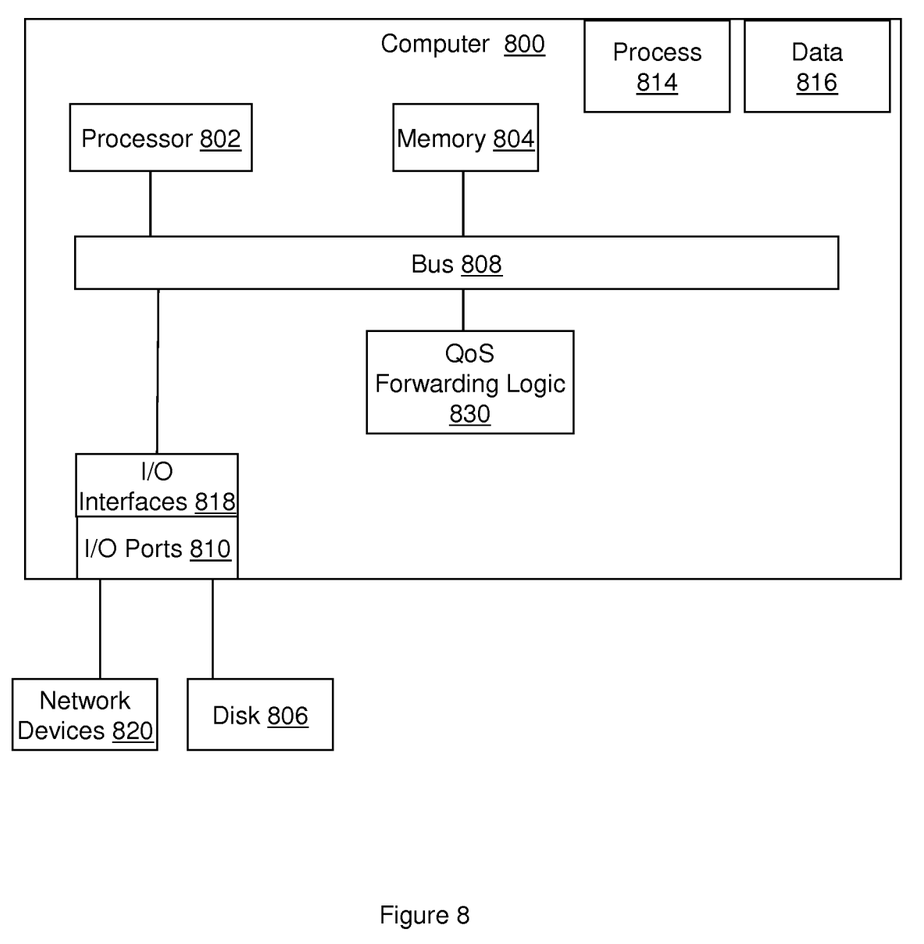
FIG. 8 illustrates an example computing environment in which example systems, apparatus, methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a QoS forwarding logic 830 configured to facilitate selectively forwarding encrypted network communications according to a QoS policy. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for selectively forwarding encrypted network communications according to a QoS policy. The means may be implemented, for example, as an ASIC programmed to selectively forward encrypted network communications according to a QoS policy. The means may also be implemented as computer executable instructions that are presented to computer 800 as data 816 that are temporarily stored in memory 804 and then executed by processor 802. Logic 830 may also provide means (e.g., hardware, software, firmware) for identifying a security signal in a communication.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, Read Only Memory (ROM), and Programmable ROM (PROM). Volatile memory may include, for example, Random-Access Memory (RAM), Static RAM (SRAM), and Dynamic RAM (DRAM).

A disk 806 may be operably connected to the computer 800 via, for example, an input/output interface (e.g., card, device) 818 and an input/output port 810. The disk 806 may be, for example, a magnetic disk drive, a solid-state disk drive, a floppy disk drive, a tape drive, a Zip drive, a flash memory card, and a memory stick. Furthermore, the disk 806 may be a Compact Disc ROM (CD-ROM) drive, a CD Recordable (CD-R) drive, a CD ReWritable (CD-RW) drive, and a Digital Versatile Disc ROM (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., Peripheral Component Interconnect Express (PCIE), 1394, Universal Serial Bus (USB), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, and the network devices 820. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a Local Area Network (LAN), a Wide Area Network (WAN), and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and apparatus described herein. This application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer readable medium storing computer readable instructions that when executed by a computer cause the computer to perform a method, the method comprising:

identifying a security indicator in an encrypted network communication;

determining whether a match exists between the security indicator and any of known security indicators stored in a Quality of Service (QoS) database;

in response to determining that the security indicator identified in the encrypted network communication matches a particular known security indicator, from the known security indicators, determining a particular QoS policy associated with the particular known security indicator; determining a class of service indicator based on the particular QoS policy associated with the particular known security indicator; generating indicator indicating the particular QoS policy; adding the new header to the encrypted network communication; selectively forwarding the encrypted network communication according to the particular QoS policy associated with the particular known security indicator in the QoS database;

where the particular QoS policy controls QoS associated with a connection over which the encrypted network communication is forwarded.

2. The non-transitory computer readable medium of claim 1, the method comprising selectively storing a control packet security indicator sniffed from a control packet network communication, where the control packet security indicator is stored as a known security indicator, and where the control packet security indicator is associated with an entry in the QoS database, the control packet security indicator being stored in response to determining that a match exists between a control packet identification field and a QoS database entry.

3. The non-transitory computer readable medium of claim 2, where the control packet identification field is one of a Connectivity Association Key Name (CKN) field, a Key Management Domain (KMD) field, a Virtual Local Area Network (VLAN) tag, a field in an Announcement Type-Length-Value (TLV), and a vendor-defined TLV.

4. The non-transitory computer readable medium of claim 2, where the control packet is a MACsec Key Agreement (MKA) packet.

5. The non-transitory computer readable medium of claim 1, where the security indicator is a secure channel indicator (SCI) in a Media Access Control Security (MACsec) packet.

6. The non-transitory computer readable medium of claim 1, where the encrypted network communication is a MACsec communication according to IEEE Std 802.1AE.

7. The non-transitory computer readable medium of claim 1, where the encrypted network communication is encrypted according to IEEE Std 802.1X.

8. The non-transitory computer readable medium of claim 1, where the policy is provided by one of a management console, and a provisioning protocol; and where the policy is stored in the QoS database.

9. The non-transitory computer readable medium of claim 1, where selectively forwarding the encrypted network communication comprises forwarding the encrypted network communication to a network device in a Data Center Interconnect (DCI).

10. The non-transitory computer readable medium of claim 9, where the encrypted network communication is selectively forwarded over one of an Ethernet-over-Multiprotocol Label Switching (MPLS) network, a Metro Ethernet network, and a Virtual Private LAN Service (VPLS) provider network.

11. The non-transitory computer readable medium of claim 1, where adding the new header to the encrypted network communication comprises adding an IEEE Std 802.1Q header to the encrypted network communication with a Class of Service (CoS) field, where the CoS field is added as a function of the policy associated with the known security indicator.

12. An apparatus, comprising:
a Quality of Service (QoS) data store device to store a QoS policy;
an identification logic which, when executed on the QoS data store device, causes detecting a passport signal in an encrypted network communication;
a compare logic which, when executed on the QoS data store device, causes determining whether the passport signal is a known passport signal in the QoS data store by finding, in a QoS database, a match between the passport signal and the known passport signal associated with the QoS policy, where a known passport signal is associated with the QoS policy that controls QoS associated with a connection; and
a forwarding logic which, when executed on the QoS data store device, causes in response to determining that the passport signal detected in the encrypted network communication matches a particular known passport signal, from the QoS database, determining a particular QoS policy associated with the particular known passport signal; determining a class of service indicator based on the particular known passport signal; generating a new header comprising the class of service indicator indicating the particular QoS policy; selectively relaying the encrypted network communication according to the particular QoS policy associated with the particular known passport signal in the QoS data base and determined for the passport signal detected in the encrypted network communication.

13. The apparatus of claim 12, comprising:
a sniffing logic which, when executed on the QoS data store device, causes identifying a control packet passport signal from a control packet network communication; and
a provisioning logic which, when executed on the QoS data store device, causes storing the control packet passport signal as a known passport signal in the QoS data store, where the control packet passport signal is associated with an entry in the QoS data store, and where the control packet passport signal is stored as a known passport indicator in response to determining that a match exists between a control packet identification field and a QoS data store entry.

14. The apparatus of claim 12, where the passport signal is a secure channel indicator (SCI) in a Media Access Control Security (MACsec) packet.

15. The apparatus of claim 12, where the forwarding logic which, when executed on the QoS data store device further causes selectively relaying the encrypted network communication to one of an enterprise switch, and a router.

16. The apparatus of claim 12, where the QoS policy comprises a plurality of QoS entries, where a QoS entry comprises one or more of, a QoS requirement, a Virtual Local Area Network (VLAN) tag, a known passport signal, and a control packet identifier.

17. The apparatus of claim 16, where the control packet identifier is one of a Connectivity Association Key Name (CKN), a Key Management Domain (KMD) name, a Virtual Local Area Network (VLAN) tag, an Announcement Type-Length-Value (TLV) value, and a vendor-defined TLV value.

18. The apparatus of claim 12, where the QoS policy is provided to the QoS data store by one of a management console, and a management protocol.

19. The apparatus of claim 12, where the apparatus is one of a switch, and a router.

20. A method, comprising:
identifying a security indicator in an encrypted network communication;
determining whether a match exists between the security indicator and any of known security indicators stored in a Quality of Service (QoS) database;
in response to determining that the security indicator identified in the encrypted network communication matches a particular known security indicator, from the known security indicators, determining a particular QoS policy associated with the particular known security indicator; determining a class of service indicator based on the particular QoS policy associated with the particular known security indicator; generating indicator indicating the particular QoS policy; adding the new header to the encrypted network communication; selectively forwarding the encrypted network communication according to the particular QoS policy associated with the particular known security indicator in the QoS database;
where the particular QoS policy controls QoS associated with a connection over which the encrypted network communication is forwarded.

21. The method of claim 20, comprising:

selectively storing a control packet security indicator sniffed from a control packet network communication, where the control packet security indicator is stored as a known security indicator, and where the control packet security indicator is associated with an entry in the QoS database, the control packet security indicator being stored in response to determining that a match exists between a control packet identification field and a QoS database entry.

* * * * *